US00RE44675E

(19) United States
(12) Reissued Patent
Hawkins et al.

(10) Patent Number: US RE44,675 E
(45) **Date of Reissued Patent: *Dec. 31, 2013**

(54) FOLDABLE TOOL WITH SINGLE BEAM CONSTRUCTION

(75) Inventors: Eric H. Hawkins, Lake Elmo, MN (US); Pierre A. G. Oster, Lespignan (FR)

(73) Assignee: Bicycle Tools Incorporated, St. Paul, MN (US)

( * ) Notice: This patent is subject to a terminal disclaimer.

(21) Appl. No.: 11/839,977

(22) Filed: Sep. 14, 2007

Related U.S. Patent Documents

Reissue of:
(64) Patent No.: 7,140,280
Issued: Nov. 28, 2006
Appl. No.: 10/907,458
Filed: Apr. 1, 2005

U.S. Applications:
(63) Continuation-in-part of application No. 10/447,163, filed on May 27, 2003, now Pat. No. 6,880,435.

(51) Int. Cl.
*B25B 1/08* (2006.01)
*B25B 1/04* (2006.01)

(52) U.S. Cl.
USPC ..... 81/440; 7/138; 7/168; 81/177.4

(58) Field of Classification Search
USPC ..... 81/440, 124.5, 177.6, 177.4, 490; 7/128, 168, 165, 158, 167, 118; D8/105, 107
See application file for complete search history.

(56) References Cited

U.S. PATENT DOCUMENTS

| | | | | | |
|---|---|---|---|---|---|
| 22,923 | A | * | 2/1859 | Wicks | 7/165 |
| 635,562 | A | | 10/1899 | Marschotz et al. | |
| 1,179,111 | A | * | 4/1916 | Knowlton | 30/155 |
| 1,369,829 | A | | 3/1921 | Minges | |
| D58,482 | S | * | 7/1921 | Helin | D8/105 |
| 1,398,583 | A | | 11/1921 | Bovee | |
| 2,097,735 | A | * | 11/1937 | Mrozinski | 7/131 |
| 2,804,970 | A | | 9/1957 | Kuc et al. | 206/16 |
| 2,828,855 | A | * | 4/1958 | Mosch | 7/118 |
| D206,852 | S | * | 1/1967 | Hedu | D8/85 |
| D223,133 | S | * | 3/1972 | Olt | D8/87 |
| 4,238,862 | A | * | 12/1980 | Leatherman | 7/128 |
| 4,327,790 | A | * | 5/1982 | Stevens et al. | 81/177.4 |
| 4,476,751 | A | * | 10/1984 | Mishima | 81/440 |
| 4,744,272 | A | * | 5/1988 | Leatherman | 7/128 |
| 4,815,346 | A | * | 3/1989 | Littlehorn | 81/439 |
| 4,854,045 | A | * | 8/1989 | Schaub | 30/155 |
| 4,856,132 | A | * | 8/1989 | Burns et al. | 7/118 |
| 4,888,869 | A | * | 12/1989 | Leatherman | 30/161 |
| 4,908,947 | A | | 3/1990 | Schaub | 30/155 |
| 5,146,815 | A | * | 9/1992 | Scott, III | 81/437 |
| 5,199,335 | A | * | 4/1993 | Arnold et al. | 81/177.8 |
| 5,303,439 | A | * | 4/1994 | Seals | 7/138 |
| 5,313,860 | A | * | 5/1994 | Liou | 81/437 |
| 5,320,004 | A | * | 6/1994 | Hsiao | 81/440 |

(Continued)

*Primary Examiner* — Hadi Shakeri
(74) *Attorney, Agent, or Firm* — Thomas J. Oppold; Larkin Hoffman Daly & Lindgren Ltd.

(57) ABSTRACT

A foldable tool kit having a body constructed of a single elongate member to which is secured a plurality of individual tools pivotally movable about a pin between a folded position and a working position.

34 Claims, 5 Drawing Sheets

Amended

(56) References Cited

U.S. PATENT DOCUMENTS

| | | | | | |
|---|---|---|---|---|---|
| 5,450,774 | A | * | 9/1995 | Chang | 81/440 |
| 5,581,834 | A | * | 12/1996 | Collins | 7/118 |
| 5,588,169 | A | * | 12/1996 | Chuang | 7/138 |
| 5,632,056 | A | | 5/1997 | Hsiao | 7/138 |
| 5,655,242 | A | | 8/1997 | Chuang | 7/138 |
| 5,711,194 | A | * | 1/1998 | Anderson et al. | 81/440 |
| 5,803,584 | A | * | 9/1998 | Chung | 362/120 |
| D401,133 | S | * | 11/1998 | Gardiner et al. | D8/105 |
| 6,014,787 | A | * | 1/2000 | Rivera | 7/128 |
| 6,047,426 | A | * | 4/2000 | McIntosh et al. | 7/129 |
| 6,092,444 | A | * | 7/2000 | Hsiao | 81/440 |
| 6,112,351 | A | * | 9/2000 | Hawkins et al. | 7/138 |
| 6,128,805 | A | * | 10/2000 | Rivera | 16/111.1 |
| 6,128,981 | A | * | 10/2000 | Bondhus et al. | 81/440 |
| 6,216,301 | B1 | * | 4/2001 | Rivera | 7/128 |
| 6,220,127 | B1 | * | 4/2001 | Berg et al. | 81/427.5 |
| RE37,210 | E | * | 6/2001 | Chuang | 7/138 |
| 6,286,168 | B1 | * | 9/2001 | Woodruff et al. | 7/138 |
| D458,823 | S | * | 6/2002 | Yeh | D8/105 |
| D463,239 | S | * | 9/2002 | Makedonski | D8/105 |
| 6,564,678 | B1 | * | 5/2003 | Wang | 81/124.4 |
| 6,574,817 | B2 | * | 6/2003 | Wu | 7/138 |
| 6,601,481 | B2 | * | 8/2003 | Chuang | 81/440 |
| 6,622,329 | B2 | * | 9/2003 | Ostor et al. | 7/138 |
| 6,751,819 | B2 | * | 6/2004 | Chuang | 7/100 |
| 6,880,435 | B2 | * | 4/2005 | Hawkins | 81/440 |
| 7,343,838 | B2 | * | 3/2008 | Tansbo et al. | 81/440 |
| 2003/0074738 | A1 | * | 4/2003 | Chuang | 7/100 |
| 2003/0140740 | A1 | * | 7/2003 | Rivera | 81/124.4 |

* cited by examiner

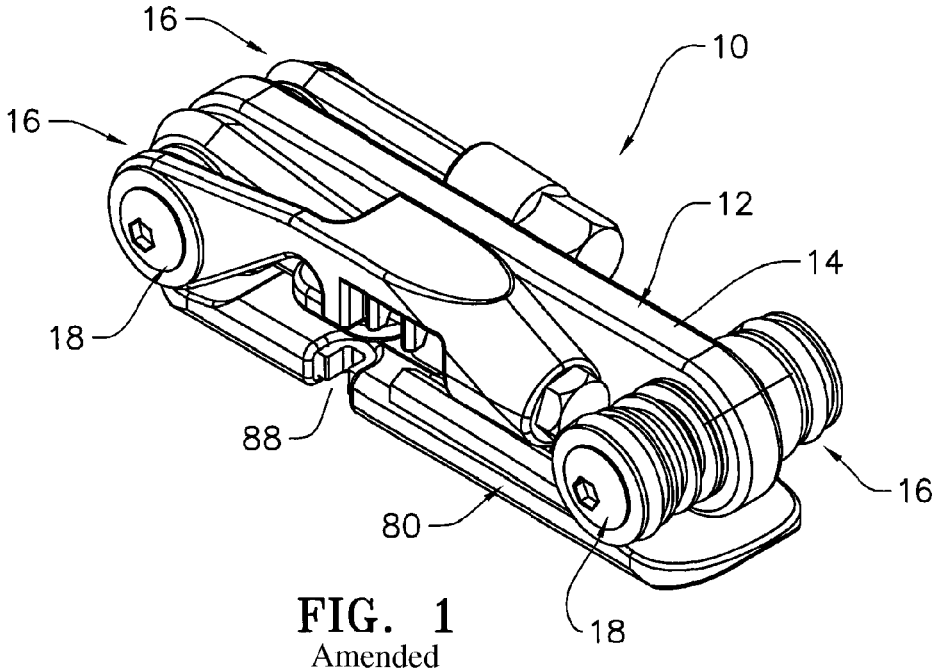
FIG. 1
Amended
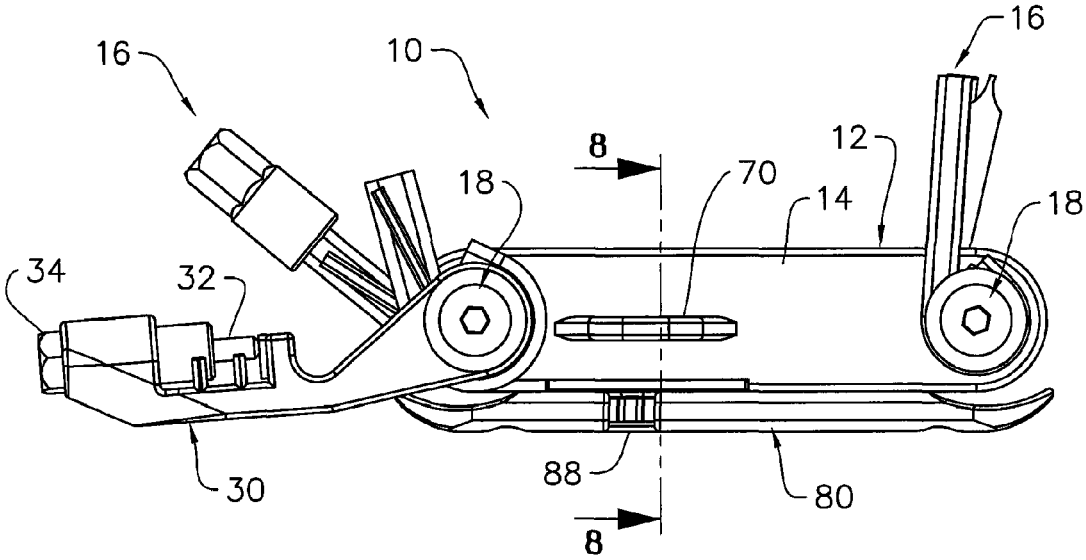
FIG. 2
Amended

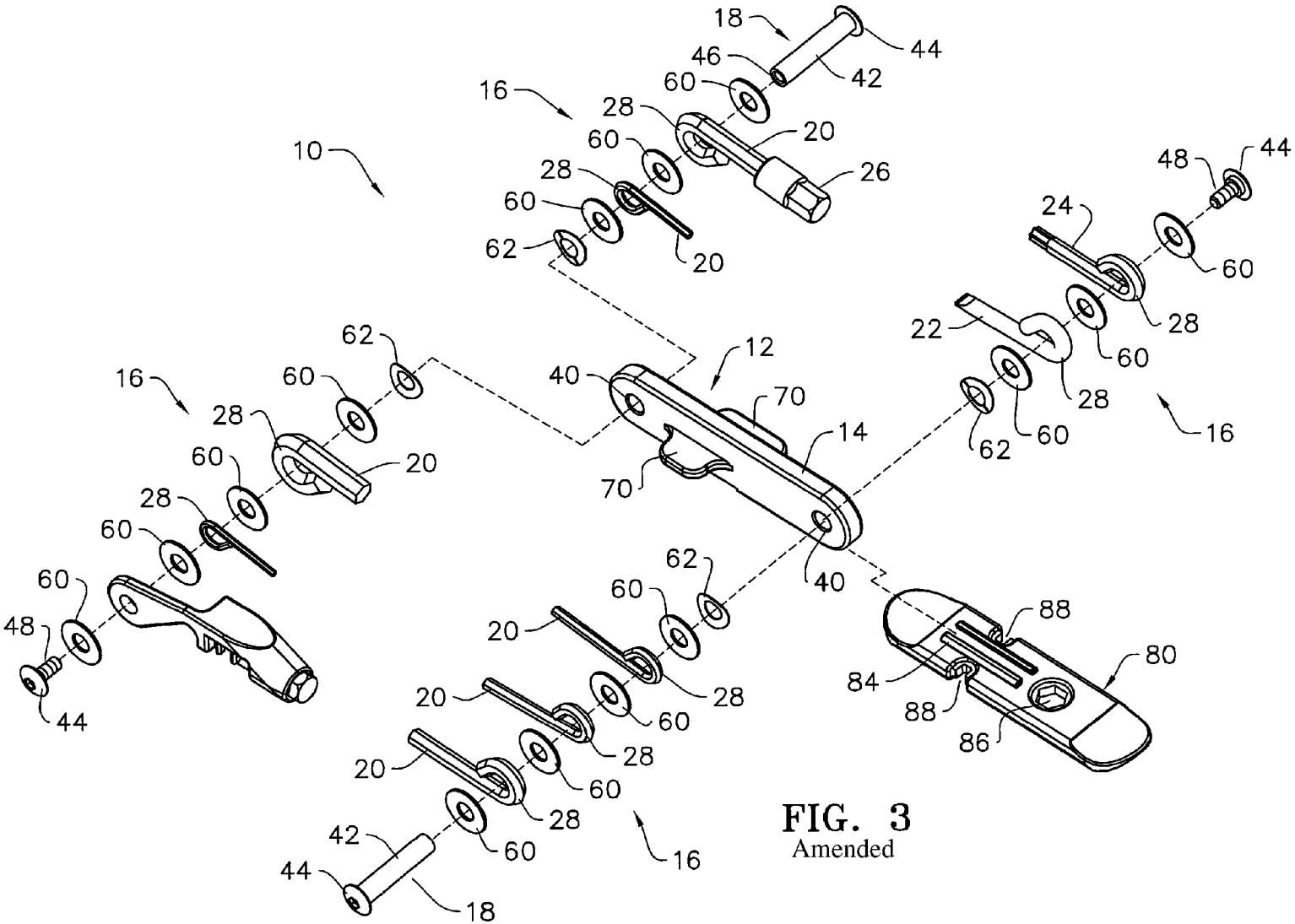
FIG. 3
Amended

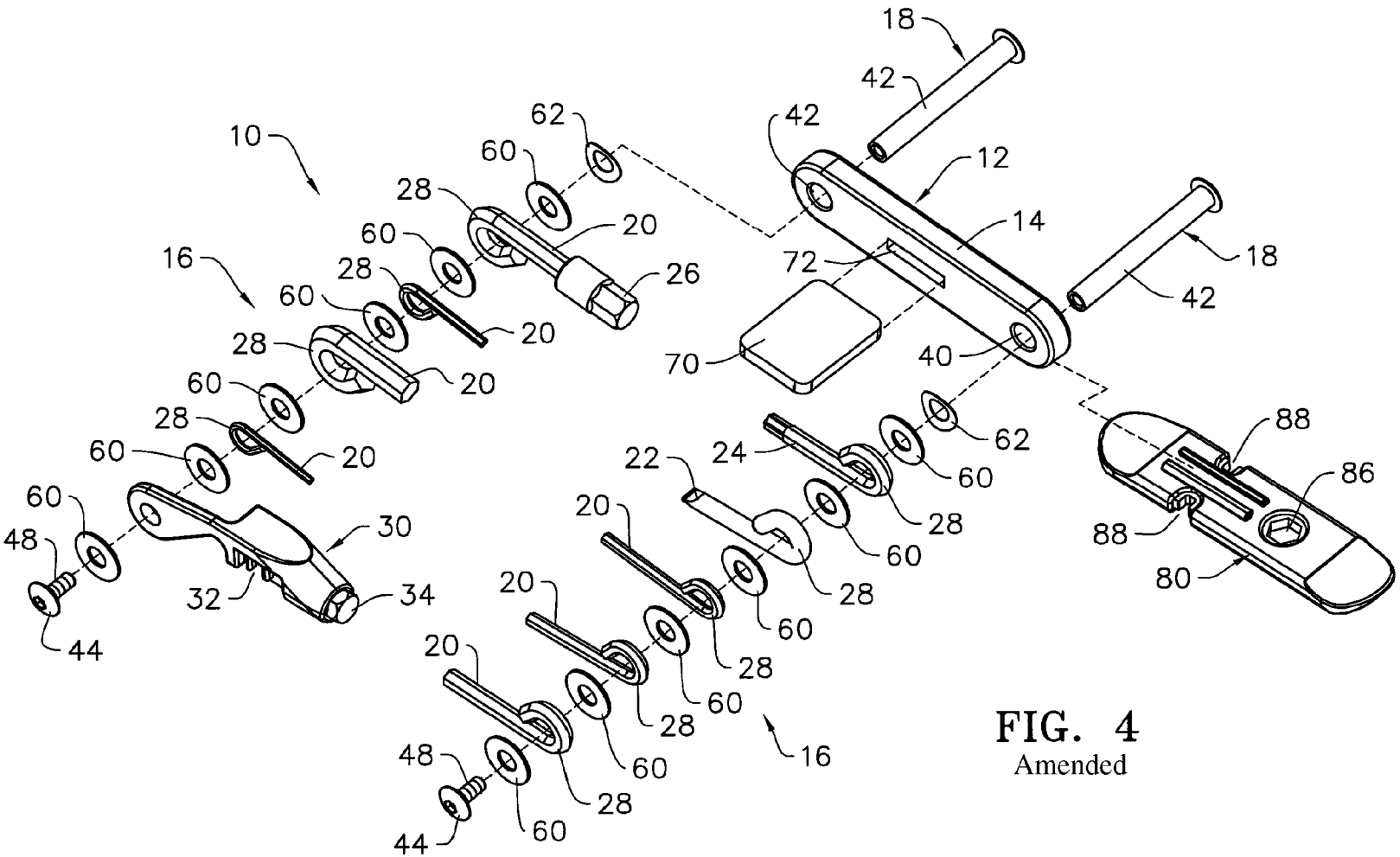
FIG. 4
Amended

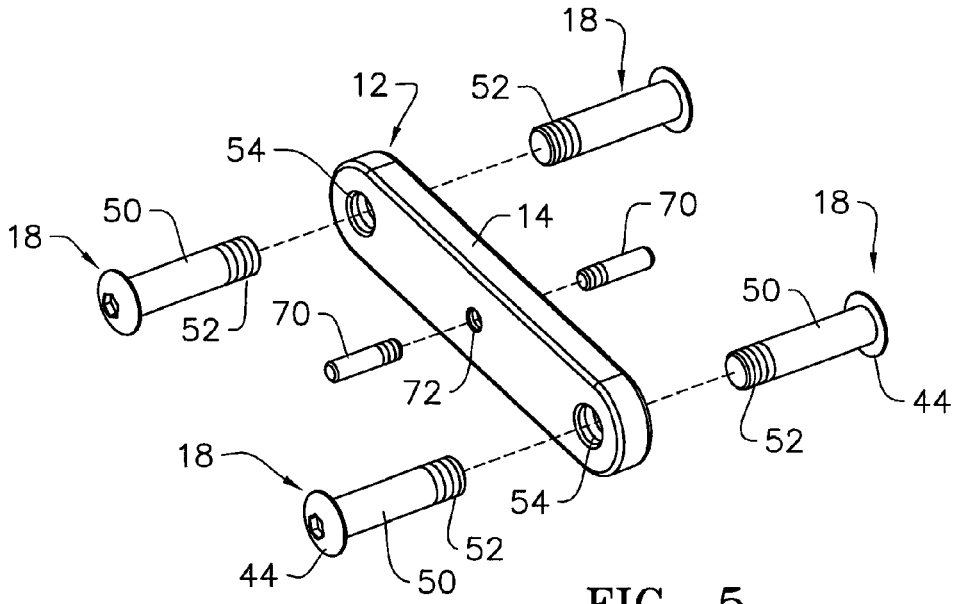
FIG. 5
Amended
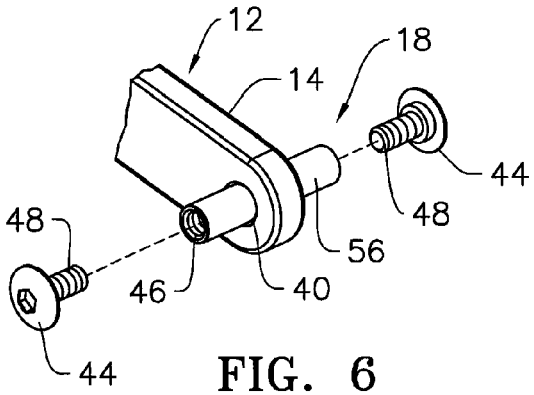
FIG. 6
Amended
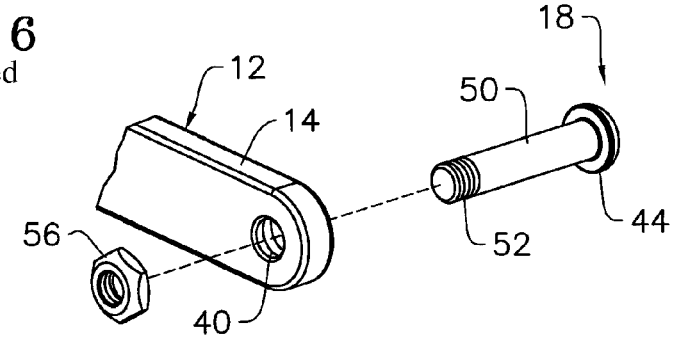
FIG. 7
Amended

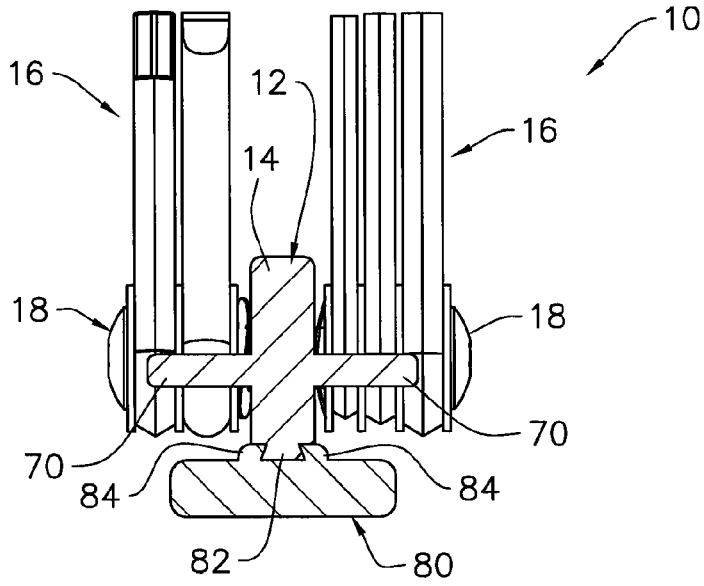
FIG. 8
Amended
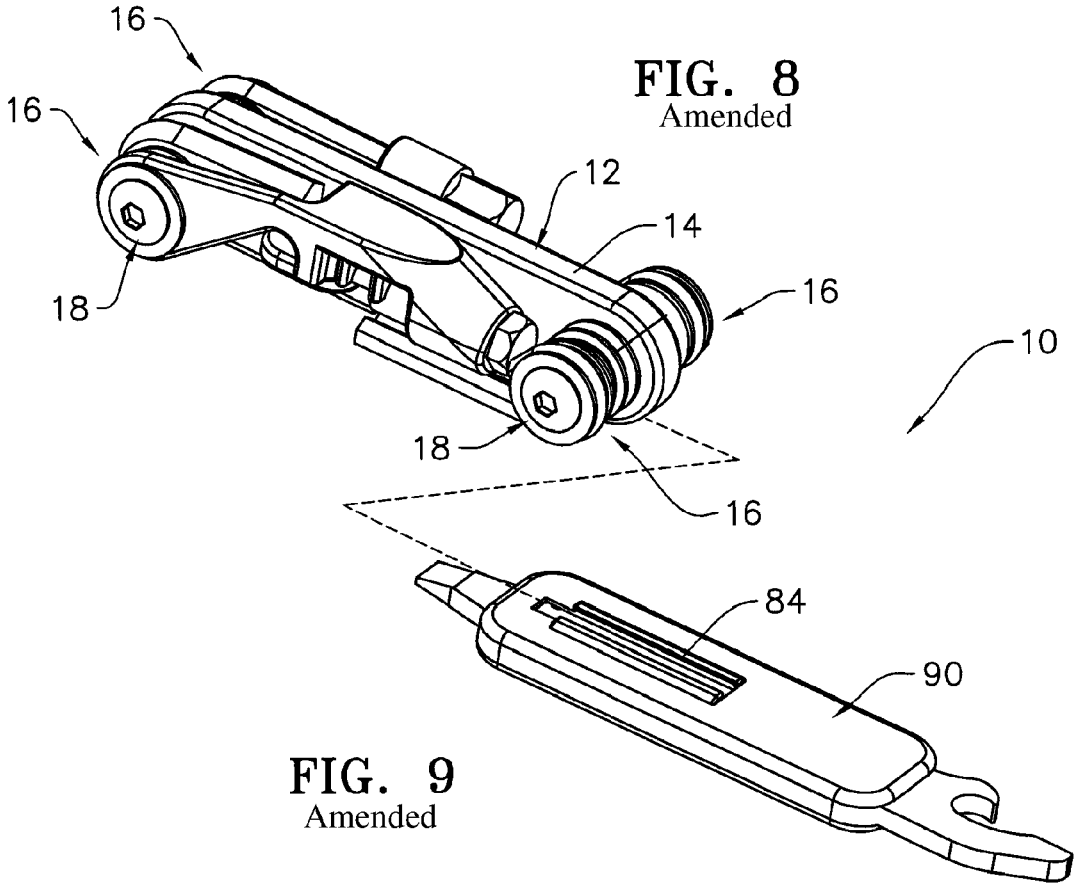
FIG. 9
Amended

FOLDABLE TOOL WITH SINGLE BEAM CONSTRUCTION

Matter enclosed in heavy brackets [ ] appears in the original patent but forms no part of this reissue specification; matter printed in italics indicates the additions made by reissue.

CROSS-REFERENCE TO RELATED APPLICATIONS

This application is a Continuation-In-Part of U.S. patent application Ser. No. 10/447,163, filed May 27, 2003, now U.S. Pat. No. 6,880,435.

BACKGROUND OF THE INVENTION

1. Field of the Invention

The present invention relates generally to hand tools, and, more particularly, to foldable multipurpose tool kits or combination tools.

2. Description of the Related Art

Multipurpose tool kits or combination tools are well known in the bicycle industry, in particular. This is due primarily to the fact that only a limited number of tools are required to meet most of the mechanical repair needs of bicycles. As a result, bicyclists and technicians find it beneficial and convenient to combine select tools into a single multipurpose tool kit or combination tool.

Among competitive cyclists and bicycle enthusiasts, it is generally desired for multipurpose tool kits to be as compact and lightweight as possible for ease of carrying while riding, but without compromising the sturdiness or performance of the individual tools of the tool kit. At the same time, it is desirable to include as many tools as possible in the tool kit to ensure the cyclists have available, in one tool kit, the tools necessary to repair most mechanical breakdowns likely to be experienced while riding. It should be appreciated, however, that the desire to provide a sturdy, rigid tool kit with a multiple of quality tools necessarily conflicts with the competing interest of providing a compact, lightweight tool kit.

In attempting to satisfy the foregoing competing interests many combination tool kits have been developed. While the various commercially available tool kit designs may serve their intended purpose, heretofore, none have satisfactorily met all the foregoing competing interests and objectives. Heretofore, all known bicycle tool kits have utilized a shackle or clevis type design in which the individual tools are pivotally disposed on a shaft or pin supported at each end by an eyelet or ear. The eyelets or ears may be disposed in the opposing sidewalls of the tool kit body (much like a jack knife design), such as disclosed in U.S. Pat. No. 6,601,481 to Chuang; U.S. Pat. No. 6,216,301 to Rivera; U.S. Pat. No. 5,581,834 to Collins; U.S. Pat. No. 5,450,774 to Chang; and/or U.S. Pat. No. 5,320,004 to Hsiao. In other tool kit designs, the ears or eyelets extend or project from a wide block or base comprising a portion of the tool kit, such as disclosed in U.S. Pat. No. RE37210 to Chuang; U.S. Pat. No. 6,564,678 to Wang; U.S. Pat. No. 6,622,329 to Ostor et al.; and U.S. Pat. No. 6,112,351 to Hawkins et al.

While the foregoing shackle or clevis type designs minimize torque and bending stresses exerted on the pin when the tools are in use due to the pin being supported at both ends, such shackle or clevis type designs necessarily result in greater weight and size of the tool kit as a result of the additional sidewall or larger block base associated with such designs. Thus, it should be appreciated, that by eliminating one of the sidewalls of the foregoing designs or by eliminating one of the ears or eyelets projecting from the block base of the other foregoing designs, substantial weight reduction can be achieved.

The present invention overcomes the shortfalls of other commercially available multipurpose tool kits by providing a lightweight, compact tool kit comprising a plurality tools necessary for meeting most mechanical repair needs experienced with bicycles, without sacrificing tool quality or performance or the sturdiness or rigidity of tool kit as a whole. In addition, as identified herein, the present invention offers other features and advantages over known multipurpose tool kits or combination tools.

SUMMARY OF THE INVENTION

A foldable tool kit having a body constructed of a single elongate beam member to which is pivotally secured a plurality of individual tools pivotally movable about a pin between a folded position and a working position. The plurality of tools may include any type or combination of tools, including, but not limited to hex wrenches, screwdrivers, and chain tools.

In one embodiment, the tool kit includes a single pin supported by the single elongate member substantially transverse and approximate one end of the single elongate member. The pin may have one end cantilevered from the single elongate member or the pin may be supported substantially at its midpoint such that its two ends are cantilevered on each side of the single elongate member.

In another embodiment, rather than a single pin, there may be two pins supported by the single elongate member on opposing sides thereof.

In another embodiment, the tool kit may be substantially as described in either of the two immediately preceding paragraphs but with a second single pin or two pins supported at the other end of the single elongate member.

In all of the foregoing embodiments, the single elongate member preferably includes at least one tool stop to abut the tools in the folded position so that the tools are not free to rotate 360 degrees in one direction. If the tool kit includes tools pivotally secured to the elongate member at each end thereof, as in the preferred embodiment, it should be appreciated that multiple tool stops may be provided, depending on the cantilevered arrangement of the pin and the positioning of the tools on the pin with respect to the single elongate member.

In the preferred embodiment, a tire lever is provided which removable attaches to the single elongate member. Also in the preferred embodiment, the single elongate member removably attaches to and cooperates with secondary tools.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of one embodiment of the tool kit of the present invention wherein the individual tools are shown in the folded position.

FIG. 2 is a side elevation view of the tool kit of FIG. 1 with the tools splayed out in a variety of working positions.

FIG. 3 is an exploded perspective view of the tool kit of FIG. 1.

FIG. 4 is an exploded perspective view of an alternative embodiment of the tool kit of the present invention with only one end of the pin cantilevered from the elongate member such that all the tools are disposed on one side of the elongate member and further illustrating an alternative method of fixing a tool stop to the elongate member.

FIG. 5 is an exploded perspective view of another alternative embodiment of the tool kit of the present invention (with the tools removed for clarity) wherein the pins and tool stop are threadably secured to the elongate member.

FIG. 6 is a detailed perspective view of one end of another alternative embodiment of the tool kit of the present invention (with the tools removed for clarity) wherein the pin is shown connected to the elongate member by a press-fit connection.

FIG. 7 is a detailed perspective view of one end of another alternative embodiment of the tool kit of the present invention (with the tools removed for clarity) wherein a domed nut threadably receives the pin extending through an aperture in the elongate member.

FIG. 8 is a cross-sectional view of the tool kit of FIG. 2 as viewed along lines 8-8 of FIG. 2.

FIG. 9 is a perspective view of the tool kit of FIG. 1 showing the tool kit with the preferred tire lever removed and replaceable with a supplemental tool for cooperation therewith.

DETAILED DESCRIPTION OF THE INVENTION

Referring now to the drawings, wherein like reference numerals designate identical or corresponding parts throughout the several figures, drawing FIG. 1 illustrates one embodiment of a multipurpose tool kit or combination tool of the present invention, designated generally by reference numeral 10.

The tool kit 10 includes a body 12 comprising a single elongate beam member 14 to which is pivotally secured a plurality of individual tools 16 pivotally movable about a pin or shaft 18 (FIG. 3) between a folded position (FIG. 1) and a variety of working positions (FIG. 2). Although the embodiments illustrated in the various drawing figures shows the tools 16 pivotally attached near the ends of the elongate member 14, it should be appreciated that the tools 16 may be pivotally attached anywhere along the length of the elongate member 14.

The tools 16 may include any combination of individual tools. However, as best illustrated in FIG. 3 which is an exploded perspective view of the preferred embodiment of the tool 10, the tools 16 include a range of hex wrenches 20, for example, 1.5 mm, 2.0 mm, 2.5 mm, 3.0 mm, 4.0 mm, 5.0 mm and 6.0 mm hex wrenches. In addition, the tools 16 of the preferred tool kit 10, includes a screwdriver 22 (either flathead, Phillips head (not shown) or both) and a six-point or star shaped driver 24, commonly known as a Torx® fitting driver. Also, the tool kit 10 preferably includes an 8.0 mm hex key socket 26 having a 6.0 mm internal hex for removably mounting onto the end of the 6.0 mm hex wrench. The wrenches 20 and screwdrivers 22, 24 are preferably formed from steel bar stock bent at one end to form a circular opening 28 (FIG. 3) through which the pin 18 is received.

Among the tools 16 is also preferably a chain tool 30 for repairing bicycle chains. The chain tool 30 includes a chain support 32 for receiving the bicycle chain and a pressure screw 34 used to force or dislodge the rivets joining the chain links.

Continuing to refer to FIG. 3, the shafts or pins 18 preferably extend through apertures 40 in the elongate member 14. In this embodiment, each of the pins 18 comprise a stud 42 having a head 44 at one end and internal threads 46 at its other end for receiving a threaded fastener 48 also having a head 44. As best illustrated in FIG. 8, when assembled, the two heads 44 at each end of the stud 42 removably secures the individual tools 16 onto the pin 18. In this embodiment, each end of the pin 18 cantilevers from opposite sides of the elongate member 14 whereby each cantilevered end supports a group of tools on each side of the elongate member. The tools are preferably divided such that the tools readily nest with adjacent tools and/or opposing tools while in the folded position, so as to provide a more compact tool kit 10.

An alternative embodiment of the tool kit 10 is illustrated in FIG. 4 wherein the pin 18 is disposed such that only one end of the pins 18 cantilever from the elongate member 14, whereby the individual tools 16 are all disposed on only one side of the elongate member 14. Alternatively, rather the tools 16 being disposed on only one side of the elongate member 14 at both ends, the pins 18 may cantilever from the elongate member 14 in opposing directions, such that half the tools are disposed on one side of the elongate member 14 at one end thereof and the other half of the tools are disposed on the other side of the elongate member 14 at the other end thereof.

Furthermore, it should be appreciated that the pin 18 may take any suitable form recognized by those of skill in the art for pivotally securing tools 16 to an elongate member. For example, as illustrated in FIG. 5, the pin 18 may comprise two separate studs 50 having external threads 52 at one end thereof and a head 44 at the other end. In this embodiment, the threaded ends 52 threadably engage internally threaded apertures 54 extending completely or partially through the elongate member 14. In yet another alternative embodiment, as illustrated in FIG. 6, the pin 18 may comprise a stud 56 having internal threads 46 at each end thereof for receiving a threaded fastener 48. In this embodiment, the stud 56 may be press fit into an aperture 40 in the elongate member 14 or it may be bonded thereto, such as by welding or by an adhesive, or the stud 56 may be formed integral with the elongate member 14. In yet another embodiment, as illustrated in FIG. 7, the pin 18 may comprise a stud 50 having external threads 52 at one end as previously described with respect to the stud 50 illustrated in FIG. 5. However, in the embodiment of FIG. 7, the stud 50 preferably extends through an aperture 40 in the elongate member 14 and is threadably received by a domed nut 56. It should be appreciated that with any of the embodiments of the tool 10 described and illustrated in FIGS. 5-7, the pin 18 may comprise one stud having two cantilevered ends (as best illustrated in FIGS. 3, 6, 7 and 8), one stud having one cantilevered end (as best illustrated in FIG. 4), or two studs having one cantilevered end (as best illustrated in FIG. 5) or any combination thereof.

Also in the preferred embodiment, as best illustrated in FIG. 3, washers 60 or other suitable spacers, are disposed between each of the individual tools 16 and adjacent the heads 44 of the pin 18. The washers 60 between the individual tools serve to separate adjacent tools to prevent their rubbing or interference with when being moved between their folded position and an open working position. The washers 60 adjacent to the heads 44, serve to provide a larger surface area against which the heads 44 can bear, so as to more securely hold the tools 16 onto the pin 18. In addition, a compression washer 62 is preferably provided between the elongate member 14 and the first washer 60 to maintain a tight frictional fit between adjacent tools so as to minimize wobbling or lateral movement of the tools on the pin 18.

As illustrated in FIGS. 2 and 8, in the preferred embodiment, the tool kit 10 includes stops 70 projecting from each side of the elongate member 14 and formed integral therewith. These stops 70 provide a surface against which the tools 16 will abut when in the folded position so that the tools 16 are restrained from pivoting fully about the pin 18 in one direction. As with the pins 18, the stops 70 may take any desired form and may project from the elongate member 14 in any desired manner. For example, rather than being substantially flat and integral with the elongate member 14, the stops 70 may be press fit into an opening 72 in the elongate member 14 as illustrated in FIG. 4. Alternatively, the stops 70 may be cylindrical and threadably connected to the elongate member 14, as illustrated in FIG. 5, for example. Alternatively, the stops 70 may fixed or secured, such as by welding or by an adhesive, to the elongate member. It should also be appreciated that depending on whether the tools 16 are disposed on one side or both sides of the elongate member, the tool may use one stop (as in FIG. 4) or two stops (as best illustrated in FIGS. 5 and 8). Furthermore, depending on the tools, the stop(s) 70 may be disposed substantially at the midpoint of the elongate member (as shown in FIGS. 2 and 3) or the stops may be disposed closer to one end of the elongate member 14.

Additionally, as best illustrated in FIGS. 1-3 and 8, in the preferred embodiment, the tool kit 10 includes a tire lever 80 which preferably removably attaches to the elongate member 14 by any suitable connection, including, for example, by a magnetic connection, a dove tail connection, or any other suitable means of attachment. As best illustrated in FIG. 8, in the preferred embodiment, the tire lever 80 slidably attaches to the elongate member by a dovetail connection, wherein the elongate member 14 includes a male wedge shaped tenon 82 and the tire lever 80 includes a mating female mortise 84 which slidably receives the tenon 82. Also, as best illustrated in FIG. 3, the tire lever 80 also preferably includes a box wrench 86 for matingly receiving the head of the pressure screw 34 of the chain tool 30. The tire lever 80 may further include cutouts 88 for functioning as spoke wrenches or the like.

In addition, as illustrated in FIG. 9, the tool kit 10 of the present invention preferably cooperates with secondary tools 90. In the example of FIG. 9, one such secondary tool 90 is shown as a bottle opener on one end and a flat head screw driver on the other. Other secondary tools 90 which may cooperate with the tool 10 may include knife blades, open end wrenches of varying sizes, a pin spanner, etc. In the embodiment of FIG. 9, the tire lever 80 is shown removed and replaceable with one of the secondary tools 90 attachable to the elongate member 14 by the above described dovetail connection, wherein the supplemental tool 90 includes a mating female mortise 84 adapted to slidably receive the male tenon 82.

Various modification to the embodiments of the tool kit described herein will be readily apparent to those of skill in the art. As such, the present invention is not to be limited to the embodiments described above and illustrated in the drawing figures, but rather should be accorded the widest scope consistent with the spirit and scope of the appended claims.

What is claimed is:

1. A tool kit, comprising:

a body member, said body member comprising a single elongate member;

a first pin supported by said single elongate member with at least a portion of said first pin cantilevered outwardly and substantially transverse to said single elongate member;

a first plurality of tools pivotally supported on said cantilevered portion of said first pin such that said first plurality of tools are movable about said cantilevered portion between a working position and a folded position;

a second pin supported by said single elongate member with at least a portion of said second pin cantilevered outwardly and substantially transverse to said single elongate member;

a second plurality of tools pivotally supported on said cantilevered portion of said second pin such that said second plurality of tools are movable about said cantilevered portion between a working position and a folded position.

2. The tool kit of claim 1 wherein said first pin is disposed proximate a first end of said single elongate member.

3. The tool kit of claim 1 wherein said second pin is disposed proximate a second end of said single elongate member.

4. The tool kit of claim 1 further comprising:

a first tool stop extending substantially transverse to said single elongate member and whereby said first tool stop prevents said first plurality of tools from pivoting about said cantilevered portion of said first pin in one direction past said folded position.

5. The tool kit of claim 4 further comprising:

a second tool stop extending substantially transverse to said elongate member and whereby said second tool stop prevents said second plurality of tools from pivoting about said cantilevered portion of said second pin in one direction past said folded position.

6. The tool kit of claim 1 wherein both ends of said first pin extend outwardly and substantially transverse to said single elongate member on opposing sides of said single elongate member.

7. The tool kit of claim 1 wherein both ends of said second pin extend outwardly and substantially transverse to said single elongate member on opposing sides of said single elongate member.

8. The tool kit of claim 1 wherein one of said first and second plurality of tools includes hex wrenches.

9. The tool kit of claim 1 wherein one of said first and second plurality of tools includes a chain tool.

10. The tool kit of claim 1 further including a tire lever.

11. The tool kit of claim 10 further including means for removably attaching said tire lever to said elongate member.

12. The tool kit of claim 11 wherein said means for removably attaching said tire lever to said elongate member further cooperates with secondary tools.

13. A combination tool, comprising:

a single elongate body member;

a first pin having a cantilevered portion supported by and extending in a substantially transverse direction away from said single elongate body member;

a first plurality of tools pivotally supported in adjacent relation on said cantilevered portion such that said first plurality of tools are movable about said cantilevered portion between a working position and a folded position;

at least one biasing member supported on said cantilevered portion;

a head secured at a free end of said cantilevered portion and disposed so as to cause said at least one biasing member to bias individual tools of said first plurality of tools in frictional engagement, thereby minimizing movement of said individual tools in said transverse direction.

14. The combination tool of claim 13 wherein said at least one biasing member is a compression washer.

15. The combination tool of claim 14 further including spacers disposed between said adjacent individual tools of said first plurality of tools.

16. The combination tool of claim 13 wherein said first pin is removably secured to said single elongate body member.

17. The combination tool of claim 13 further comprising:

a second pin having a cantilevered portion supported by and extending in a substantially transverse direction away from said single elongate body member;

a second plurality of tools pivotally supported in adjacent relation on said cantilevered portion of said second pin such that said second plurality of tools are movable about said cantilevered portion of said second pin between a working position and a folded position;

at least one biasing member supported on said cantilevered portion of said second pin;

a head secured at a free end of said cantilevered portion of said second pin and disposed so as to cause said at least one biasing member to bias individual tools of said second plurality of tools in frictional engagement, thereby minimizing movement of said individual tools of said second plurality of tools in said transverse direction.

18. The combination tool of claim 13 further comprising:

a first tool stop extending substantially transverse to said single elongate body member and whereby said first tool stop prevents said first plurality of tools from pivoting about said cantilevered portion of said first pin in one direction past said folded position.

19. The combination tool of claim 17 further comprising:

a second tool stop extending substantially transverse to said single elongate body member and whereby said second tool stop prevents said second plurality of tools from pivoting about said cantilevered portion of said second pin in one direction past said folded position.

20. The combination tool of claim 19 wherein one of said first and second plurality of tools includes hex wrenches.

21. The combination tool of claim 19 wherein one of said first and second plurality of tools includes a chain tool.

22. The combination tool of claim 13 further including a tire lever.

23. The combination tool of claim 22 further including means for removably attaching said tire lever to said single elongate body member.

24. The combination tool of claim 23 wherein said means for removably attaching said tire lever to said elongate member further cooperates with secondary tools.

*25. A combination tool, comprising:*

*a singular elongate body member having a first side, an opposing second side, a length defined by a first end and a second end;*

*a first cantilevered pin supported by said singular elongated body member having an unsupported free end with at least a portion of said first cantilevered pin cantilevered outwardly extending substantially transverse from said first side;*

*at least one first tool formed from bar stock bent at one end to form a loop through which said first cantilevered pin is received such that said at least one first tool is pivotally disposed on said first cantilevered pin between said unsupported free end and said first side and pivotal between a working position and a folded position;*

*a second cantilevered pin supported by said singular elongated body member having an unsupported free end with at least a portion of said second cantilevered pin cantilevered outwardly extending substantially transverse from said second side;*

*at least one second tool formed from bar stock bent at one end to form a loop through which said second cantilevered pin is received such that said at least one second tool is pivotally disposed on said second cantilevered pin between said unsupported free end and said second side and pivotal between a working position and a folded position; and*

*wherein said first cantilevered pin and said second cantilevered pin are different portions of a single pin extending through said singular elongate body member.*

*26. The combination tool of claim 25 wherein said first cantilevered pin and said second cantilevered pin are disposed proximate one of said ends.*

*27. The combination tool of claim 25 including first and second tool stops disposed on said first and second sides, respectively, whereby said first tool stop prevents said at least one first tool from pivoting about said first cantilevered pin in one direction past said folded position and whereby said second tool stop prevents said at least one second tool from pivoting about said second cantilevered pin in one direction past said folded position.*

*28. The combination tool of claim 26 including first and second tool stops disposed on said first and second sides, respectively, whereby said first tool stop prevents said at least one first tool from pivoting about said first cantilevered pin in one direction past said folded position and whereby said second tool stop prevents said at least one second tool from pivoting about said second cantilevered pin in one direction past said folded position.*

*29. A combination tool, comprising:*

*a singular elongate body member having a first side and an opposing second side and a length defined by a first end and a second end;*

*a first cantilevered pin supported by said singular elongated body member having an unsupported free end with at least a portion of said first cantilevered pin cantilevered outwardly extending substantially transverse to said singular elongate body member on said first side and proximate said first end;*

*at least one first tool formed from bar stock bent at one end to form a loop through which said first cantilevered pin is received such that said at least one first tool is pivotally supported on said first cantilevered pin between said unsupported free end and said first side and pivotal between a working position and a folded position;*

*a second cantilevered pin supported by said singular elongated body member having an unsupported free end with at least a portion of said second cantilevered pin cantilevered outwardly extending substantially transverse to said elongate body member on said first side and proximate said second end;*

*at least one second tool formed from bar stock bent at one end to form a loop through which said second cantilevered pin is received such that said at least one second tool is pivotally supported on said second cantilevered pin between said unsupported free end and said first side and pivotal between a working position and a folded position.*

*30. The combination tool of claim 29 including a first tool stop disposed on said first side, whereby said first tool stop prevents said at least one first tool from pivoting about said first cantilevered pin in one direction past said folded position, and whereby said first tool stop prevents said at least one second tool from pivoting about said second cantilevered pin in one direction past said folded position.*

*31. The combination tool of claim 29 further including:*

*a third cantilevered pin supported by and disposed substantially transverse to said elongate body member on said second side and proximate said first end;*

*at least one third tool formed from bar stock bent at one end to form a loop through which said third cantilevered pin is received such that said at least one third tool is pivotally supported on said third cantilevered pin and pivotal between a working position and a folded position.*

*32. The combination tool of claim 31 further including:*

*a fourth cantilevered pin supported by and disposed substantially transverse to said elongate body member on said second side and proximate said second end;*

*at least one fourth tool formed from bar stock bent at one end to form a loop through which said fourth cantilevered pin is received such that said at least one fourth tool is pivotally supported only on said fourth cantilevered pin and pivotal between a working position and a folded position.*

*33. The combination tool of claim 31 including a second tool stop disposed on said second side, whereby said second tool stop prevents said at least one third tool from pivoting about said third cantilevered pin in one direction past said folded position.*

*34. The combination tool of claim 33 whereby said second tool stop prevents said at least one fourth tool from pivoting about said fourth cantilevered pin in one direction past said folded position.*

* * * * *